United States Patent
Chavez

(10) Patent No.: US 10,684,097 B2
(45) Date of Patent: Jun. 16, 2020

(54) THERMAL GUNSIGHTS

(71) Applicant: Bushnell Inc., Overland Park, KS (US)

(72) Inventor: Alejandro Chavez, Overland Park, KS (US)

(73) Assignee: Bushnell Inc., Overland Park, KS (US)

( * ) Notice: Subject to any disclaimer, the term of this patent is extended or adjusted under 35 U.S.C. 154(b) by 0 days.

(21) Appl. No.: 16/144,546

(22) Filed: Sep. 27, 2018

(65) Prior Publication Data

US 2019/0101356 A1    Apr. 4, 2019

Related U.S. Application Data

(60) Provisional application No. 62/563,683, filed on Sep. 27, 2017.

(51) Int. Cl.
| | |
|---|---|
| *F41G 1/38* | (2006.01) |
| *F41G 1/34* | (2006.01) |
| *H04N 5/33* | (2006.01) |
| *F41G 1/32* | (2006.01) |
| *F41G 3/16* | (2006.01) |
| *F41G 11/00* | (2006.01) |
| *F41G 3/08* | (2006.01) |

(52) U.S. Cl.
CPC ............... *F41G 1/345* (2013.01); *F41G 1/32* (2013.01); *F41G 3/165* (2013.01); *H04N 5/33* (2013.01); *F41G 3/08* (2013.01); *F41G 11/003* (2013.01)

(58) Field of Classification Search
CPC . F41G 1/345; F41G 3/165; F41G 1/32; F41G 3/08; F41G 3/06; F41G 3/16; F41G 3/142; F41G 11/003; H04N 5/33

USPC ............. 42/130; 250/348; 359/399; 374/121
See application file for complete search history.

(56) References Cited

U.S. PATENT DOCUMENTS

| | | | | |
|---|---|---|---|---|
| 6,871,439 | B1 * | 3/2005 | Edwards | F42B 5/035 42/84 |
| 7,913,440 | B2 * | 3/2011 | Murg | F41G 1/38 42/122 |
| 7,977,634 | B2 * | 7/2011 | Thiele | G03B 17/00 250/330 |
| 8,915,008 | B2 * | 12/2014 | Mauricio | F41G 3/165 42/111 |

(Continued)

*Primary Examiner* — Michael D David
(74) *Attorney, Agent, or Firm* — Walter M. Egbert, III; Gerard M. Donovan; Reed Smith LLP

(57) ABSTRACT

A gunsight for aiming a firearm may comprise a microbolometer and an objective optic positioned forward of the microbolometer for focusing electromagnetic waves on the microbolometer. The objective optic may comprise one or more objective lenses. The gunsight may also comprise a display and an eyepiece optic positioned rearward of the display for allowing a user to view the display through the eyepiece optic. The eyepiece optic may comprise one or more eyepiece lenses. Circuitry of the gunsight is operatively coupled to the microbolometer and the display. The circuitry may comprise one or more processors and a non-transitory computer readable medium storing one or more instruction sets. In some embodiments, the one or more instruction sets include instructions configured to be executed by the one or more processors to cause the gunsight to capture image signals with the microbolometer and display selected images on the display.

16 Claims, 14 Drawing Sheets

(56) References Cited

U.S. PATENT DOCUMENTS

| | | | | |
|---|---|---|---|---|
| 8,919,650 B2 * | 12/2014 | Browe | .................... | F41G 1/345 |
| | | | | 235/454 |
| 9,080,838 B2 * | 7/2015 | Plotsker | .................. | F41G 1/345 |
| 9,285,189 B1 | 3/2016 | Zhang et al. | | |
| 9,303,952 B2 * | 4/2016 | Hakansson | .......... | G02B 23/105 |
| 9,377,273 B1 * | 6/2016 | Loper | .................... | F41G 1/545 |
| 9,846,082 B2 * | 12/2017 | Xu | ........................ | G01J 5/0806 |
| 10,126,099 B1 * | 11/2018 | Hammond | ................ | F41G 1/30 |
| D841,112 S * | 2/2019 | Shi | ................ | D22/109 |
| 2007/0109638 A1 | 5/2007 | Tai | | |
| 2008/0163504 A1 * | 7/2008 | Smith | .................... | G01C 17/30 |
| | | | | 33/268 |
| 2013/0040268 A1 * | 2/2013 | Van der Walt | .......... | F41A 33/06 |
| | | | | 434/16 |
| 2014/0075821 A1 * | 3/2014 | Li | ............................ | F41G 1/38 |
| | | | | 42/130 |
| 2015/0153137 A1 * | 6/2015 | Newzella | ................ | F41G 1/01 |
| | | | | 42/140 |
| 2015/0176947 A1 | 6/2015 | Zaitsev | | |
| 2015/0268459 A1 * | 9/2015 | Zheng | ................ | G02B 23/145 |
| | | | | 359/422 |
| 2018/0003462 A1 * | 1/2018 | Chavez | .................. | F41G 1/345 |
| 2018/0023921 A1 * | 1/2018 | Chavez | .................. | F41G 1/345 |
| 2018/0156569 A1 * | 6/2018 | Chavez | .................. | F41C 23/16 |
| 2019/0072364 A1 * | 3/2019 | VanBecelaere | ......... | F41G 1/545 |

* cited by examiner

THERMAL GUNSIGHTS

CROSS-REFERENCE TO RELATED APPLICATION

This application claims the benefit of U.S. Provisional Patent Application No. 62/563,683, filed Sep. 27, 2017, the disclosure of which is incorporated by reference herein.

BACKGROUND OF THE DISCLOSURE

Weapon-mounted firearm accessories have become an important tool for military, police, militia, and civilian firearm users. Many firearm designs incorporate mounting rails for supporting these accessories. Using an accessory rail interface, a given accessory may be mounted to a variety of firearms or firearms platforms. Likewise, if a particular firearm includes a rail interface, a variety of accessories may be interchangeably mounted to the firearm. The interchangeability of accessories is of particular importance to military and law enforcement personnel attached to special operations units, as this allows a single firearm to be reconfigured to meet certain mission specific needs.

A number of weapon-mounted firearm accessories can be used to facilitate aiming the weapon. Examples of popular firearm accessories include targeting devices, such as LASER sighting devices, and target illuminators, such as flashlights. Firearm mounted flashlights typically attached to a mounting rail and are centered along the bore axis of the firearm. A firearm mounted flashlight is useful to light both the surrounding environment as well as possible assailants using only a single hand. This frees the other hand to call the police or fend off an attacker, or alternatively allows a user to keep both hands on the gun for a more secure grip.

Firearm-mounted lasers may be attached to an accessory rail parallel to the bore axis of a firearm. A weapon-mounted laser sighting system has several potential uses. First, a laser can aid in shooting accuracy and speed, particularly in high pressure situations. Further, lasers can aid in shooting at night or indoors in poorly lit environments. Lasers can also be used to safely practice trigger control. Finally, lasers may work as an intimidating deterrent for would-be assailants. Laser sights for weapons permit a user to aim a weapon by projecting a light beam onto a target. Laser sights permit a user to quickly aim a weapon without viewing the target through a scope or other sighting device. This also permits the user to aim and shoot from any number of other firing positions, such as permitting the user to shoot from the hip. If the laser sight is properly sighted for the distance and wind conditions involved, a projectile, such as a bullet, arrow or shot, from a weapon will strike the desired target where the light dot generated by the laser sight shines on the target.

Laser sights are not, however, without problems. For example, although laser sights work well in low light conditions, in bright light conditions laser sights occasionally perform poorly because ambient light can easily overwhelm the dot generated on the target by the laser light source, making the dot difficult or impossible for the user to see. A laser sight also uses a relatively large amount of power, so the battery life for a laser sight is typically relatively short. Also, as with other sights, a laser sight is adjusted or sighted for a particular distance and wind condition. In some combat situations, the laser beam from a laser sight may also act as a targeting beacon for an adversary.

Thermal gunsights, such as thermal riflescopes, have found use in military applications. Thermal gunsights may also be particularly useful for hunting animals of the invasive species known as feral pigs or wild boars. Feral pigs have become a significant economic problem in the United States, causing an estimated $1.5 billion in annual crop damage alone. Absent any true natural predators, a single pair of feral pigs can reproduce and grow into a population of twenty-five or more pigs in less than 12 months. These animals are known to be highly intelligent and have become nocturnal in areas of human activity. Feral pigs are known to avoid lit areas, even around potential sources of food.

SUMMARY

A gunsight for aiming a firearm may comprise a microbolometer and an objective optic positioned forward of the microbolometer for focusing electromagnetic waves on the microbolometer. The objective optic may comprise one or more objective lenses. The gunsight may also comprise a display and an eyepiece optic positioned rearward of the display for allowing a user to view the display through the eyepiece optic. The eyepiece optic may comprise one or more eyepiece lenses. Circuitry of the gunsight is operatively coupled to the microbolometer and the display. The circuitry may comprise one or more processors and a non-transitory computer readable medium storing one or more instruction sets. In some embodiments, the one or more instruction sets include instructions configured to be executed by the one or more processors to cause the gunsight to capture image signals with the microbolometer, the image signals corresponding to a first field of view, the first field of view having a first area. In some embodiments instructions are executed by the one or more processors to cause the gunsight to display an image, the image corresponding to a second field of view, the second field of view having a second area, the first area being greater than the second area. The processor may analyze the image signals from the microbolometer and identify one or more heat signatures located inside the first field of view and outside of the second field of view. The gunsight may display an icon superimposed on the first image, the icon being displayed at an icon position, the icon position being selected based on a location of a selected one of the one or more heat signatures located inside the first field of view and outside of the second field of view.

A feature and advantage of embodiments is a gunsight that displays an icon (e.g., an arrow or chevron) that points at heat signatures that are within a field of view of the microbolometer but are not in the field of view of a currently displayed image.

A feature and advantage of embodiments is a gunsight that snaps from displaying an image with a higher magnification (e.g., 8×, 4×, and/or 2×) to displaying an image with a lower magnification (e.g., 1×) when a ballistic event is detected. As used herein, the term ballistic event refers to the movement of parts or other firearm elements that indicates the operation of the firearm. For example, in various embodiments ballistic event refers to the striking of a firing pin with a projectile casing. In some embodiments ballistic event refers to ejection of the casing from the firearm after firing. As such, in various embodiments described herein, ballistic events can be detected via a motion sensor, and used to program operation of the gunsight such that certain gunsight operations correspond with certain operations of the firearm.

A feature and advantage of embodiments is a gunsight including a power save mode. If the firearm is pointed in a downward direction while the power save mode is activated, the display automatically dims. The display will return to an undimmed level of illumination when the firearm is pointed at a 45 degree angle or greater relative to a horizontal line extending in forward and rearward directions.

A feature and advantage of embodiments is a gunsight that can be selectively fixed or attached to a mounting rail, such as, for example, a Weaver or Picatinny rail. The position of the gunsight on the firearm can be readily changed. The gunsight can also be readily removed from the mounting rail.

A feature and advantage of embodiments is a gunsight that allows the user to move the location of a reticle or other image upward and/or downward. The location of the reticle or other image may be moved upward and/or downward, for example when sighting in the gunsight with a particular weapon. The location of the reticle or other image may also be moved upward and/or downward, for example, to account for the downward acceleration on the projectile imparted by gravity, which is often referred to as "bullet drop."

A feature and advantage of embodiments is a gunsight that allows the user to move the location of a reticle or other image leftward and/or rightward. The location of the reticle or other image may be moved leftward and/or rightward, for example when sighting in the gunsight with a particular weapon. The location of the reticle or other image may also be moved leftward and/or rightward, for example, to adjust for left-to-right movement due to wind (sometimes referred to as windage).

DESCRIPTION OF THE FIGURES

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
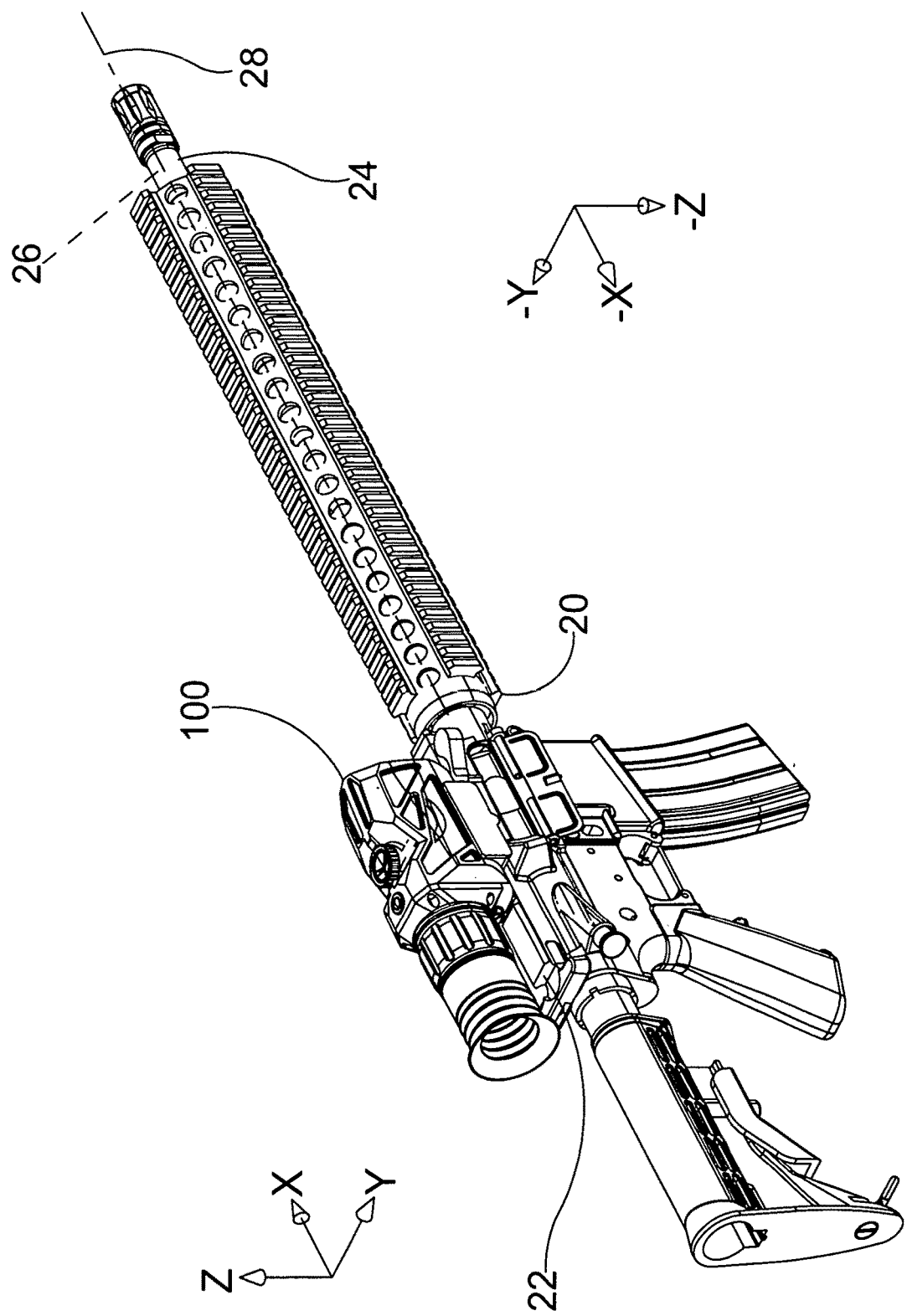
FIG. 1 is a perspective view showing a firearm and a gunsight in accordance with the detailed description.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 2:
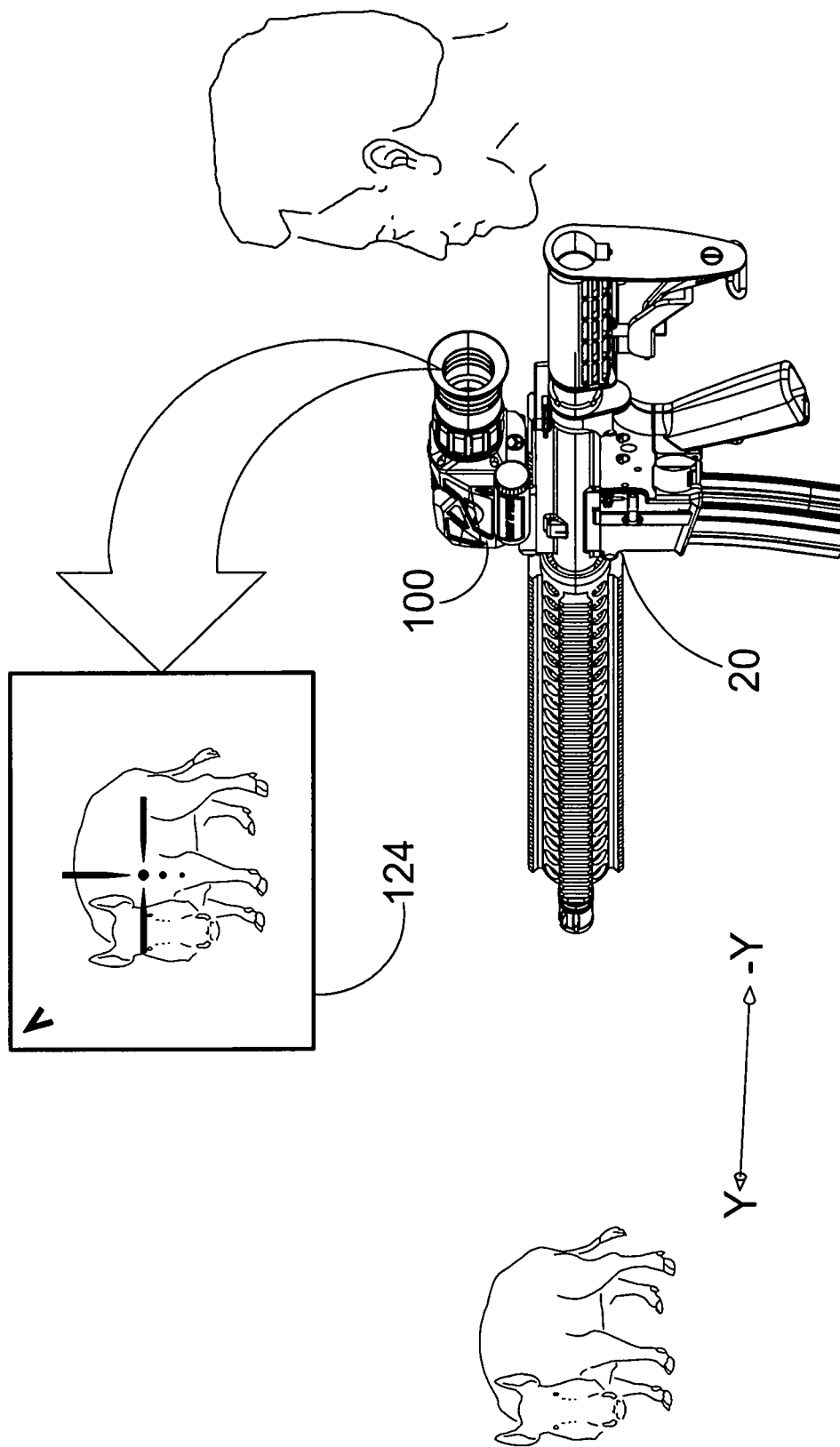
FIG. 2 is a perspective view showing the firearm and the gunsight of FIG. 1 from a different point of view. An image that may be viewed through an eyepiece optic of the gunsight is also visible in FIG. 2.
Figure 3:
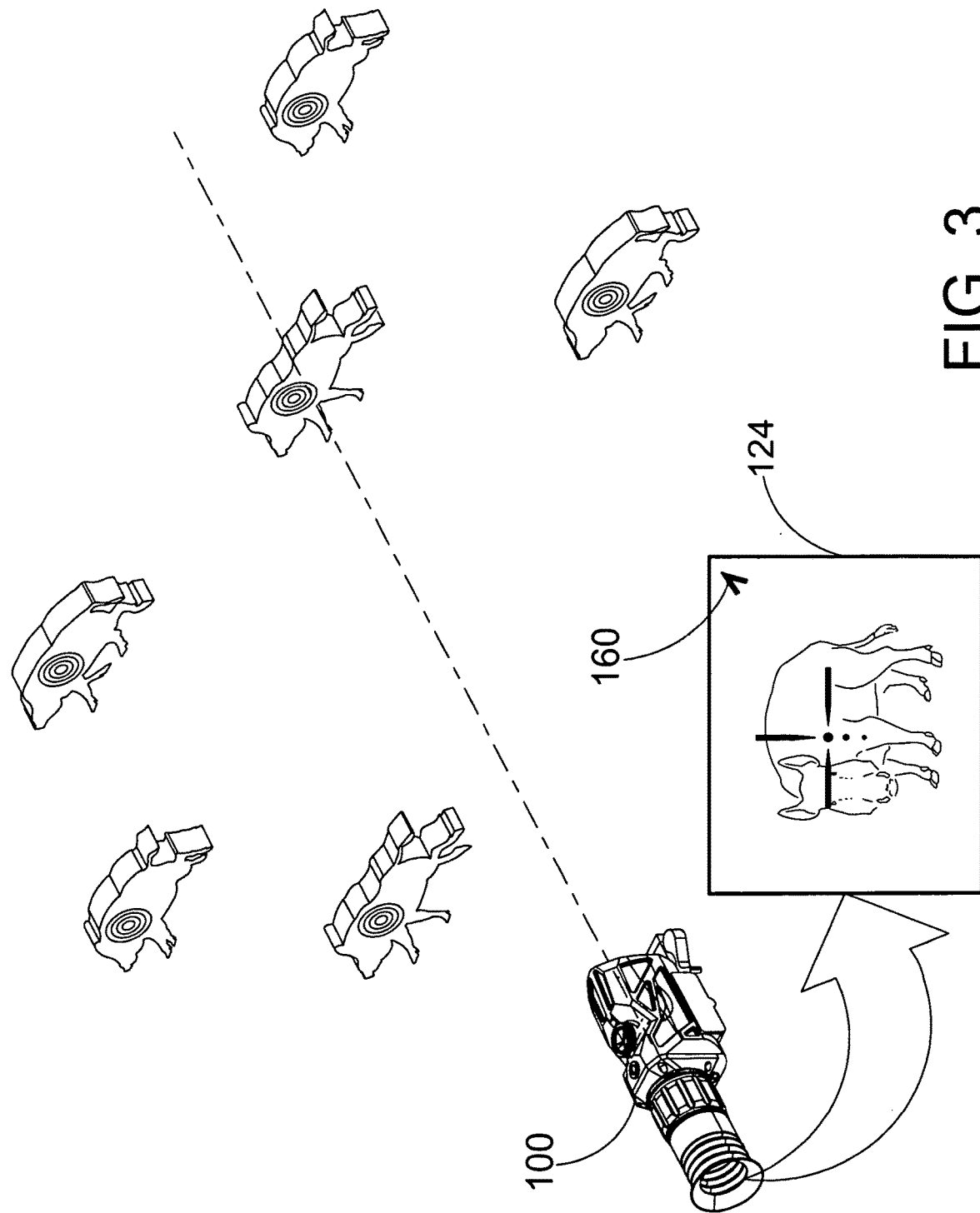
FIG. 3 is a perspective view showing a gunsight and an image that may be viewed through an eyepiece optic of the gunsight.
Figure 4:
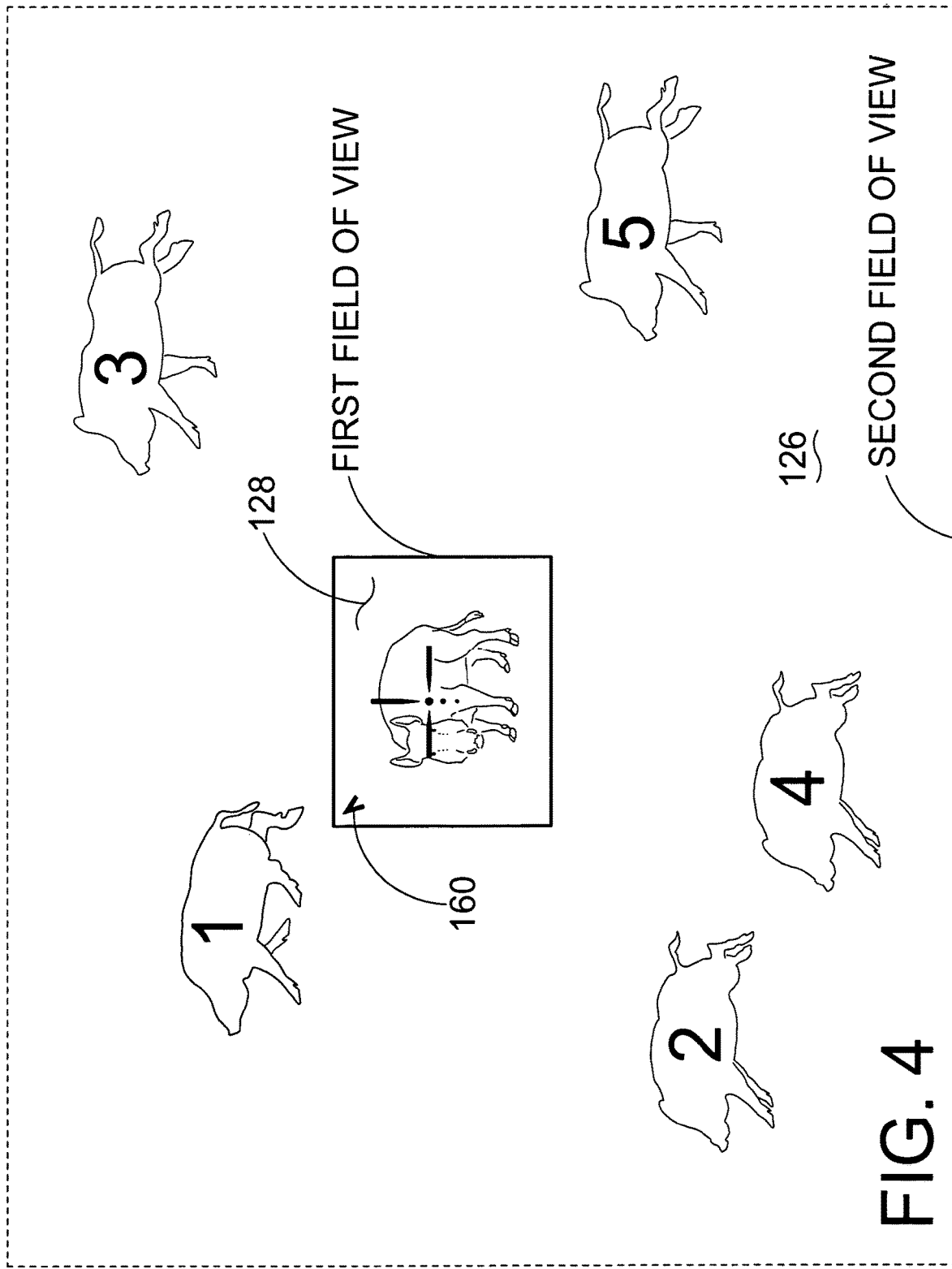
FIG. 4 is a stylized diagram illustrating the border of a field of view sensed by a microbolometer of a gunsight and the border of a field of view of an image displayed on a display of the gunsight.
Figure 5:
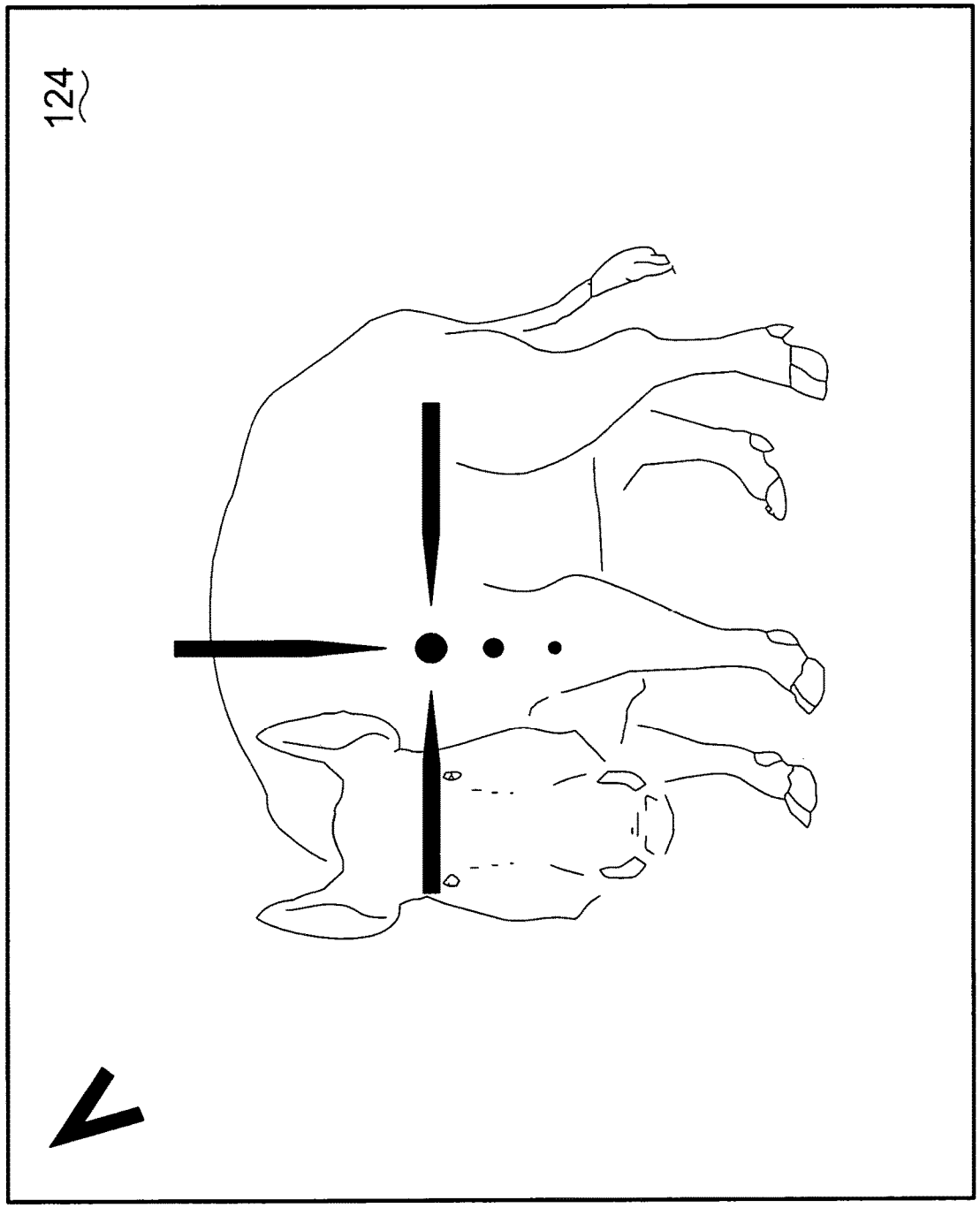
FIG. 5 is a stylized depiction of an image displayed on a display of a gunsight.

FIG. 1 is a perspective view showing a firearm 20 and a gunsight 100. In the example embodiment of FIG. 1, the gunsight 100 is fixed to a mounting rail 22 of the firearm 20. The firearm 20 has a barrel 24 defining a bore 26. The bore 26 extends along a gun bore axis 28. The gun bore axis 28 extends in a forward direction and a rearward direction. FIG. 2 is a perspective view showing the firearm and the gunsight of FIG. 1 from a different point of view. An image that may be viewed through an eyepiece optic of the gunsight is also visible in FIG. 2.

Referring, for example, to FIGS. 1-6, 8 and 9, a gunsight 100 for aiming a firearm may comprise a microbolometer 102 and an objective optic 104 positioned forward of the microbolometer 102 for focusing electromagnetic waves on the microbolometer 102. The objective optic 104 may comprise one or more objective lenses 106. The gunsight 100 also comprises a display 108 and an eyepiece optic 110 positioned rearward of the display 108 for allowing a user to view the display 108 through the eyepiece optic 110. The eyepiece optic may comprise one or more eyepiece lenses 112. Circuitry 114 of the gunsight 100 is operatively coupled to the microbolometer 102 and the display 108. The circuitry 114 may comprise one or more processors 116 and a non-transitory computer readable medium 154 storing one or more instruction sets. In some embodiments, the one or more instruction sets include instructions configured to be executed by the one or more processors 116 to cause the gunsight 100 to capture image signals with the microbolometer 102, the image signals corresponding to a first field of view, the first field of view having a first area. In some embodiments the instructions executed by the one or more processors 116 also cause the gunsight 100 to display an image on a display 108. The image corresponds to a second field of view in some embodiments. The second field of view has a second area smaller than the first area in some embodiments. The processor 116 may analyze the image signals from the microbolometer 102 and identify one or more heat signatures located inside the first field of view and outside of the second field of view. The gunsight 100 may display an icon superimposed on the first image, the icon being displayed at an icon position, the icon position being selected based on a location of a selected one of the one or more heat signatures located inside the first field of view and outside of the second field of view.

FIGS. 6A-6L are diagrammatic representations of images 124 that may be presented on the display of a gunsight. An icon 160 is displayed at a selected icon location on each image 124. In some useful embodiments, the icon location is selected to provide a user of the gunsight with an indication regarding the next closest target.

In various embodiments, the next closest target refers to a target that is measured in three-dimensions and is the closest to a reference target positioned within the second field of view. However, in certain embodiments the next closest target can be measured in a variety of ways. For example, in some embodiments the next closest target is measured as being the closest to the reference target in a two-dimensions. In certain embodiments the next closest target can be measured relative to the position of the shooter or user of the gunsight.

Figure 6A:
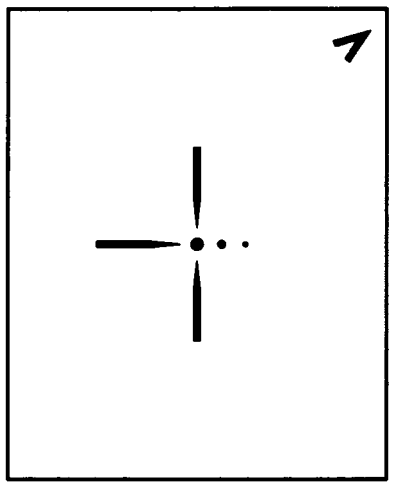
FIGS. 6A-6L are stylized depictions of images displayed on a display of a gunsight.

In FIG. 6A, an image 124 is shown with an icon 160 positioned at a location in an upper right quadrant of the image 124. In some useful embodiments, an icon 160 is positioned at a location in an upper right quadrant of the image 124 if the next closest heat signature is located forward and starboard of the field of view covered by the image. In some useful embodiments, an icon 160 is positioned at a location in an upper right quadrant of the image 124 if a selected one of one or more detected heat signatures is located forward and starboard of the field of view covered by the image.

Figure 6B:
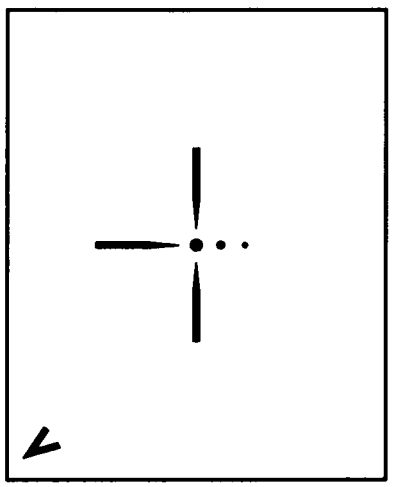

In FIG. 6B, an image 124 is shown with an icon 160 positioned at a location in an upper left quadrant of the image 124. In some useful embodiments, an icon 160 is positioned at a location in an upper left quadrant of the image 124 if the next closest heat signature is located forward and portward of the field of view covered by the image. In some useful embodiments, an icon 160 is positioned at a location in an upper left quadrant of the image 124 if a selected one of one or more detected heat signatures is located forward and portward of the field of view covered by the image.

Figure 6C:
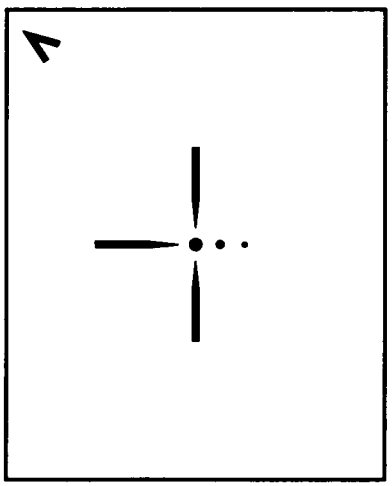

In FIG. 6C, an image 124 is shown with an icon 160 positioned at a location in a lower right quadrant of the image 124. In some useful embodiments, an icon 160 is positioned at a location in a lower right quadrant of the image 124 if the next closest heat signature is located rearward and starboard of the field of view covered by the image. In some useful embodiments, an icon 160 is positioned at a location in a lower right quadrant of the image 124 if a selected one of one or more detected heat signatures is located rearward and starboard of the field of view covered by the image.

Figure 6D:
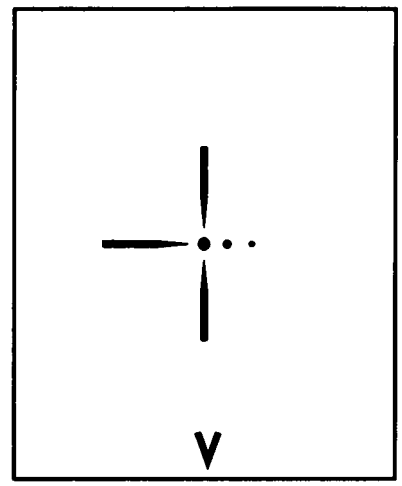

In FIG. 6D, an image 124 is shown with an icon 160 positioned at a location in a lower left quadrant of the image 124. In some useful embodiments, an icon 160 is positioned at a location in a lower left quadrant of the image 124 if the next closest heat signature is located rearward and portward of the field of view covered by the image. In some useful embodiments, an icon 160 is positioned at a location in a lower left quadrant of the image 124 if a selected one of one or more detected heat signatures is located rearward and portward of the field of view covered by the image.

Figure 6E:
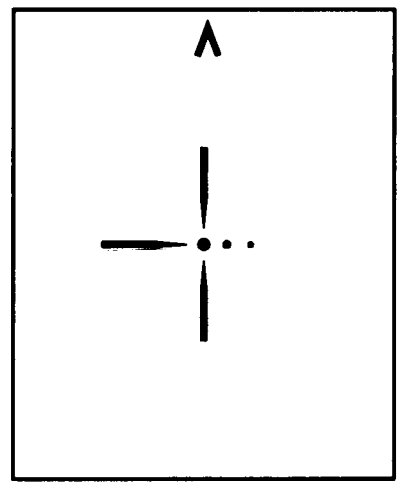

In FIG. 6E, an image 124 is shown with an icon 160 positioned at a location in a right edge of the image 124. In some useful embodiments, an icon 160 is positioned at a location in a right edge of the image 124 if the next closest heat signature is located starboard of the field of view covered by the image. In some useful embodiments, an icon 160 is positioned at a location in a right edge of the image 124 if a selected one of one or more detected heat signatures is located starboard of the field of view covered by the image.

Figure 6F:
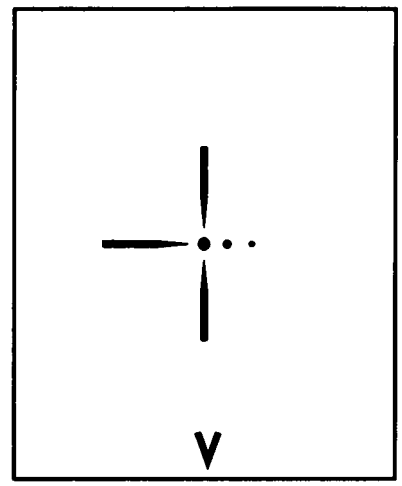

In FIG. 6F, an image 124 is shown with an icon 160 positioned at a location in a left edge of the image 124. In some useful embodiments, an icon 160 is positioned at a location in a left edge of the image 124 if the next closest heat signature is located portward of the field of view covered by the image. In some useful embodiments, an icon 160 is positioned at a location in a left edge of the image 124 if a selected one of one or more detected heat signatures is located portward of the field of view covered by the image.

Figure 6G:
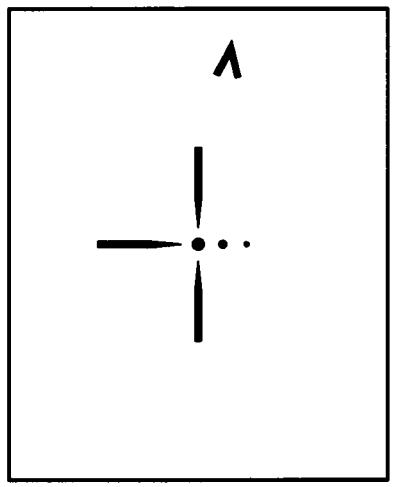
Figure 6J:
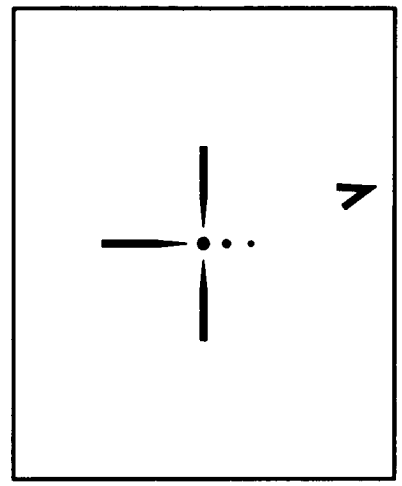

In FIG. 6G, an image 124 is shown with an icon 160 positioned at a location in an upper edge of the image 124. In some useful embodiments, an icon 160 is positioned at a location in an upper edge of the image 124 if the next closest heat signature is located forward of the field of view covered by the image. In some useful embodiments, an icon 160 is positioned at a location in an upper edge of the image 124 if a selected one of one or more detected heat signatures is located forward of the field of view covered by the image.

Figure 6H:
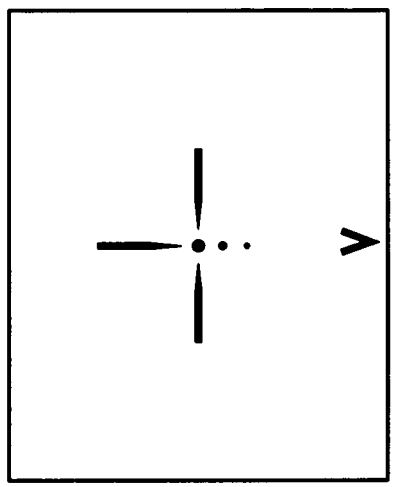
Figure 6K:
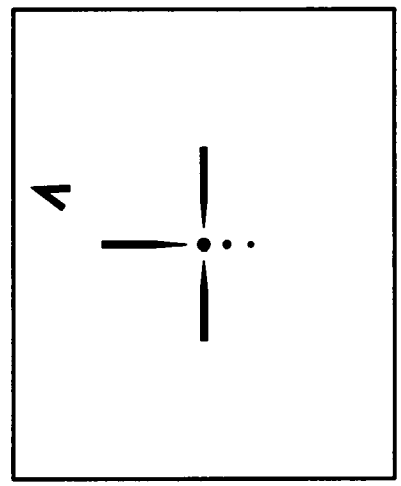
Figure 6I:
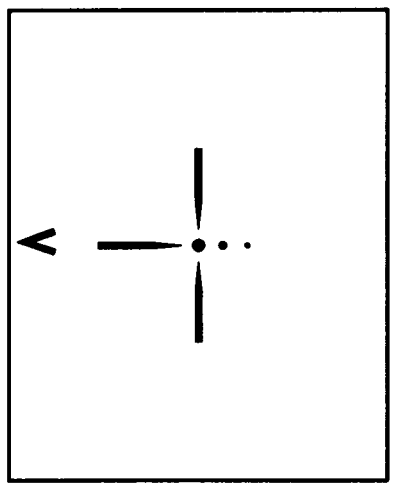
Figure 6L:
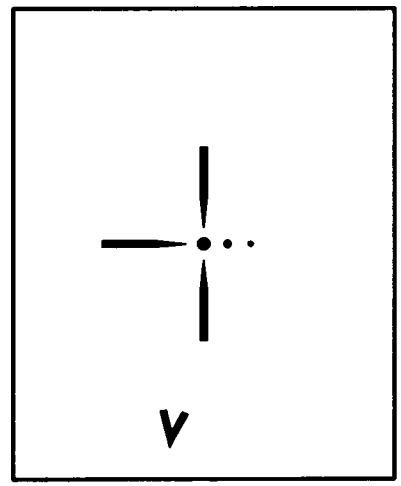

In FIG. 6H, an image 124 is shown with an icon 160 positioned at a location in a lower edge of the image 124. In some useful embodiments, an icon 160 is positioned at a location in a lower edge of the image 124 if the next closest heat signature is located rearward of the field of view covered by the image. In some useful embodiments, an icon 160 is positioned at a location in a lower edge of the image 124 if a selected one of one or more detected heat signatures is located rearward of the field of view covered by the image.

Figure 8:
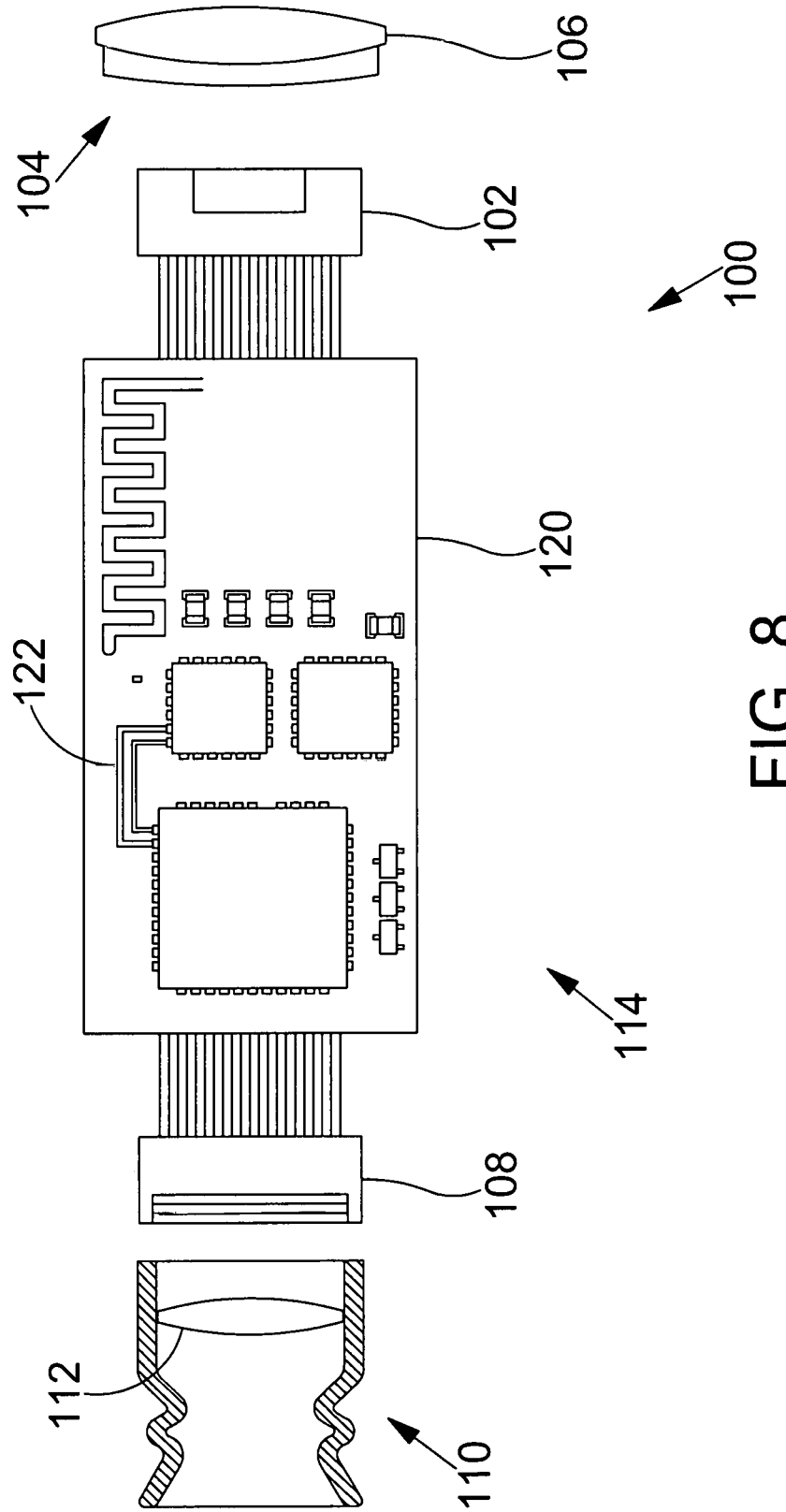
FIG. 8 is a diagram illustrating a gunsight in accordance with the detailed description.
Figure 9:
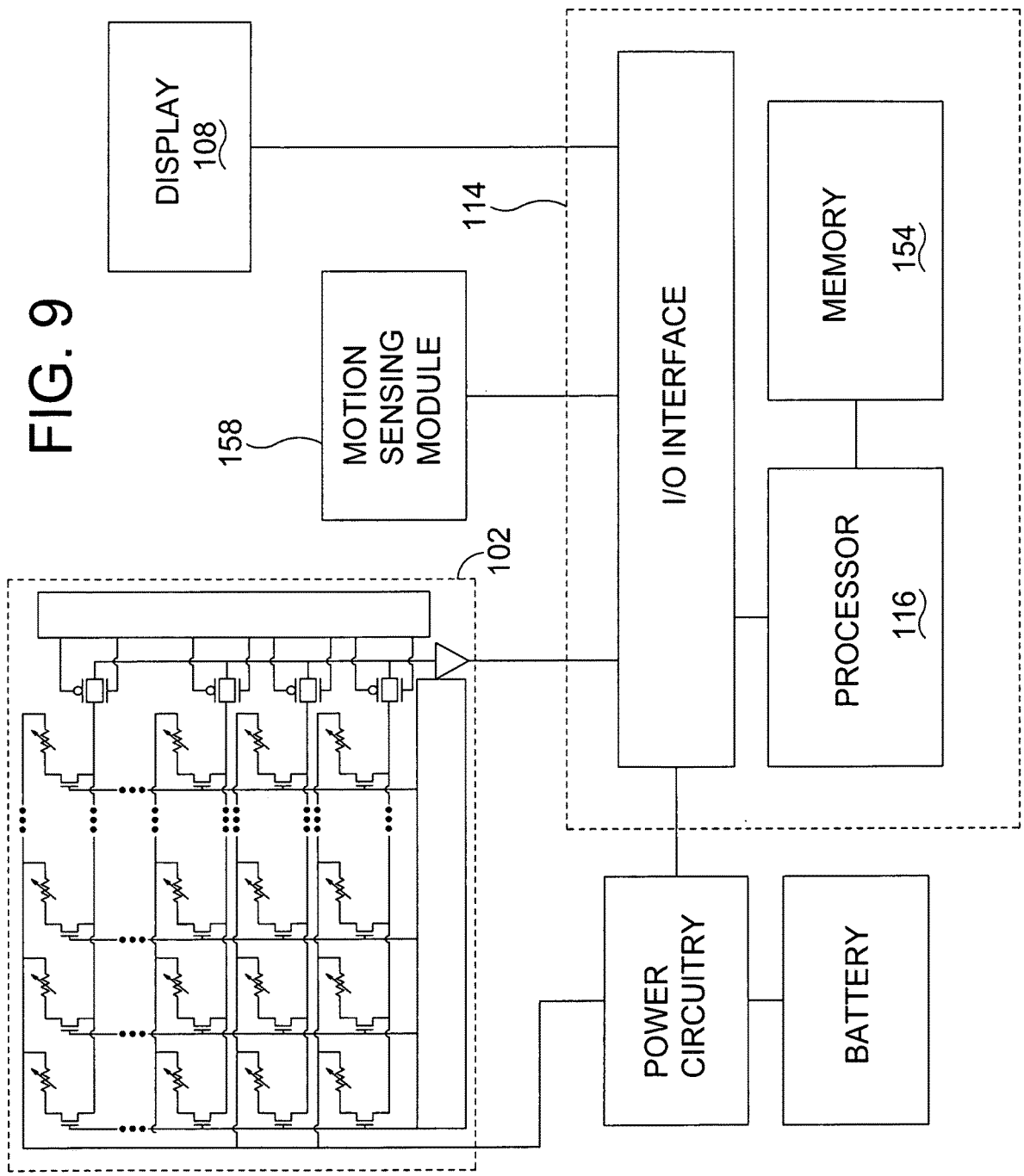
FIG. 9 is a schematic block diagram illustrating a gunsight in accordance with the detailed description.
Figure 12:
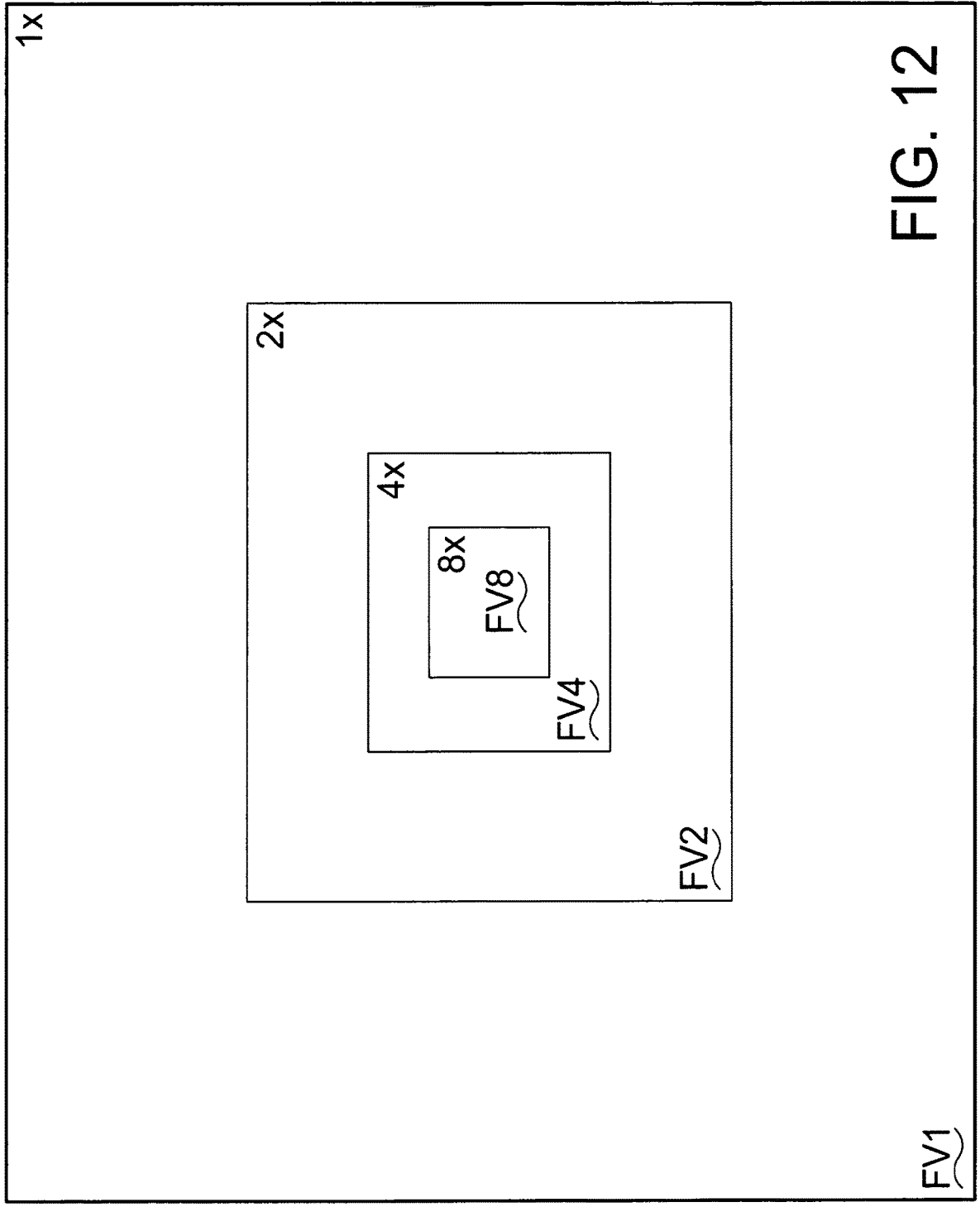
FIG. 12 is a stylized diagram illustrating a field of view corresponding to a displayed image having 1× magnification and another field of view corresponding to a displayed image having 2× magnification. The diagram of FIG. 12 also shows a field of view corresponding to a displayed image having 4× magnification and an additional field of view corresponding to a displayed image having 8× magnification.
Figure 13:
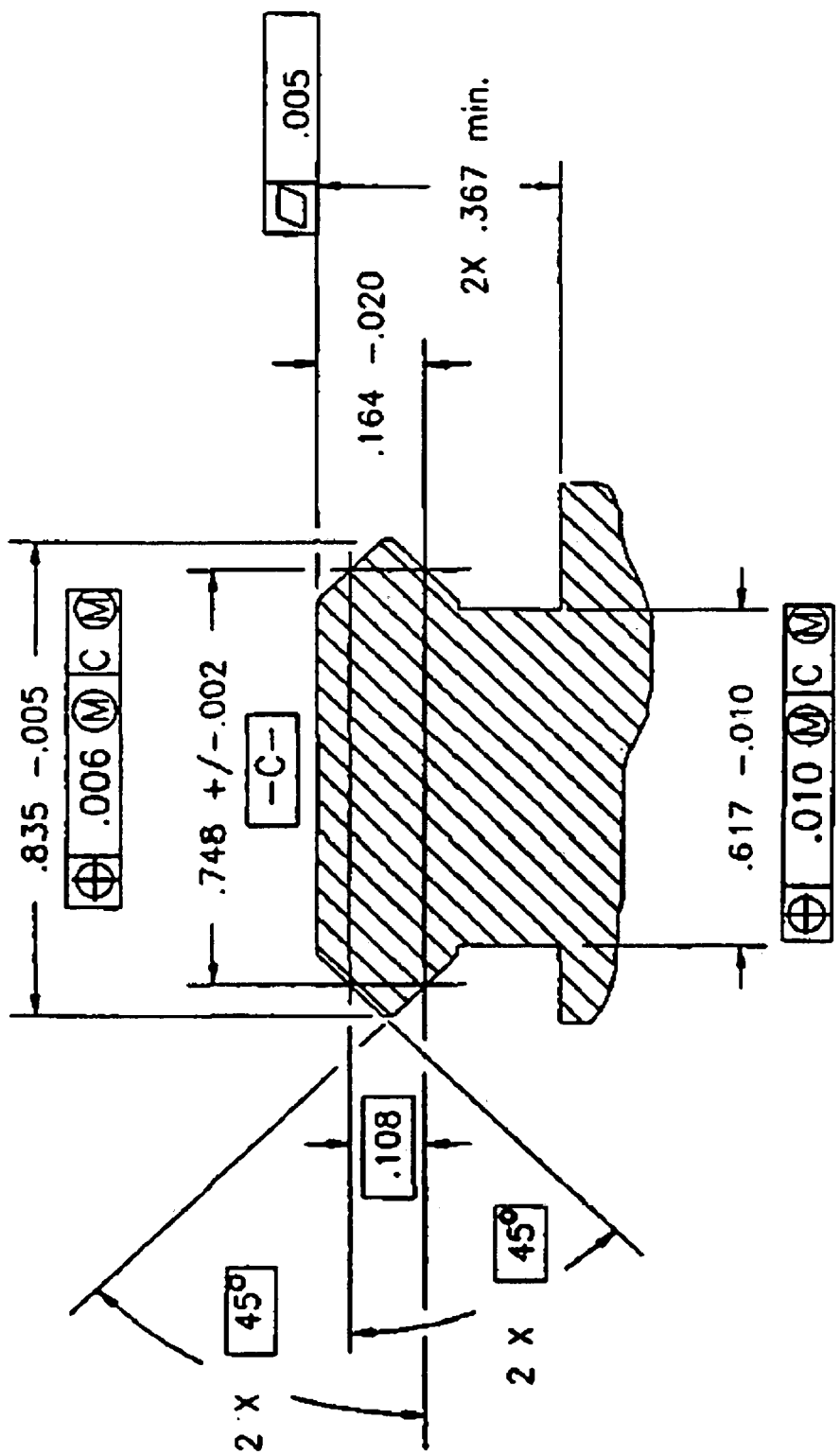
FIG. 13 is a reproduction of a mounting rail drawing from Military Standard MIL-STD-1913 dated 3 Feb. 1995.

Referring, for example, to FIGS. 8, 9 and 12, a gunsight 100 for aiming a firearm may comprise a microbolometer 102 and an objective optic 104 positioned forward of the microbolometer 102 for focusing electromagnetic waves on the microbolometer 102. The gunsight 100 also comprises a display 108 and an eyepiece optic 110 positioned rearward of the display 108 for allowing a user to view the display 108 through the eyepiece optic 110. Circuitry 114 of the gunsight 100 is operatively coupled to the microbolometer 102 and the display 108. The circuitry 114 may comprise one or more processors 116 and a non-transitory computer readable medium 154 storing one or more instruction sets. In some embodiments, the one or more instruction sets include instructions configured to be executed by the one or more processors 116 to cause the gunsight 100 to capture image signals with the microbolometer 102 and display a first image to the user. The processor 116 may receive a stream of motion signals from a motion sensing module 158, such as a accelerometer, gyroscope, or the like, and detect a ballistic event based on analysis of the stream of motion signals. The processor 116 may cause the gunsight 100 to display a second image to the user in response to detecting of the ballistic event. In some embodiments, the first image corresponds to a first magnification, the second image corresponds to a second magnification, and the first magnification is greater than the second magnification. In some embodiments, the first image corresponds to a first field of view, the second image corresponds to a second field of view, and the second field of view is larger than the first field of view.

FIG. 12 is a stylized diagram illustrating a field of view FV1 corresponding to a displayed image having 1× magnification and another field of view FV2 corresponding to a displayed image having 2× magnification. The diagram of FIG. 12 also includes a field of view FV4 corresponding to a displayed image having 4× magnification and another field of view FV8 corresponding to a displayed image having 8× magnification.

FIGS. 8 and 9 schematically illustrate a gunsight 100 in accordance with this detailed description. With reference to FIG. 8, it will be appreciated that the gunsight 100 includes a printed wiring board 118 supporting the circuitry 114. In the embodiment of FIG. 8, the printed wiring board 118 comprises a substrate 120 and the substrate 120 supports a plurality of conductive paths 122 of the circuitry 114. In the example embodiment shown in FIG. 8, the circuitry 114 comprises the printed wiring board 118 and a plurality of electronic components fixed to the printed wiring board 118. The circuitry 114 may comprise various elements without deviating from the spirit and scope of the present invention. For example, the circuitry may comprise combinational logic, a plurality of state machines and a clock that provides a clock signal to the combinational logic and the plurality of state machines. Each state machine may comprise state logic circuitry and a state memory. The state memory may comprise a plurality of memory elements such as flip-flops. The state logic circuitry of the state machine determines the conditions for changing the logical values of bits stored in the state memory. More particularly, the state logic circuitry of the state machine logically combines the binary values of a plurality of inputs with the binary values in the state memory representing the current state to generate a binary number representing the next state. The combinational logic circuitry may comprise various elements without deviating from the spirit and scope of the present description. For example, the combinational logic circuitry may comprise a plurality of discrete electronic components. By way of a second example, combinational logic circuitry may comprise a plurality of electronic components in the form of an application specific integrated circuit (ASIC). Examples of electronic components that may be suitable in some applications include logic gates. Examples of logic gates include, AND gates, NAND gates, OR gates, XOR gates, NOR gates, NOT gates, and the like. These logic gates may comprise a plurality of transistors (e.g., transistor-transistor logic (TTL)).

Still referring to FIGS. 8 and 9, the circuitry 114 may comprise various elements without deviating from the spirit and scope of the present invention. In an embodiment, for example, the circuitry 114 may comprise a processor, a memory, an input/output interface, a display, and a bus that communicatively couples the processor to the memory, the display and the input/output interface.

In an embodiment, the processor may comprise a collection of one or more logical cores or units for receiving and executing instructions or programs. For example, in one or more embodiments, the processor may be configured to receive and execute various routines, programs, objects, components, logic, data structures, and so on to perform particular tasks.

In an embodiment, the memory is a collection of various computer-readable media in the system architecture. In various embodiments, memory can include, but is not limited to volatile media, non-volatile media, removable media, and non-removable media. For example, in one or more embodiments, the memory can include random access memory (RAM), cache memory, read only memory (ROM), flash memory, solid state memory, or other suitable type of memory. In one or more embodiments, the memory includes media that is accessible to the electronic circuitry 114. For example, in some embodiments, the memory includes computer readable media located locally in the circuitry 114 and/or media located remotely to the circuitry 114 and accessible via a network. In some embodiments, the memory includes a program product having a group of one or more logical instructions that are executable by the processor to carry out the functions of the various embodiments of the disclosure.

In an embodiment, the bus comprises one or more of any of suitable type of bus structures for communicatively connecting the electronic elements. In various embodiments the bus may include a memory bus or memory controller, a peripheral bus, and a processor or local bus using any of a variety of bus architectures.

In some embodiments, the circuitry 114 includes an I/O interface coupled to a processor. The I/O interface may facilitate communication between the various components of the circuitry 114. For example, in one or more embodiments, the I/O interface may be communicatively coupled with the projector, the processor and the memory for emitting an output image via the projector. For example, in certain embodiments, the processor generates an output that corresponds to a particular pattern. The processor can transmit this output to the I/O interface which can then translate the processor output into instructions which are compatible with the projector and which result in the projector emitting light corresponding to the pattern.

In certain embodiments the I/O interface facilitates communication with input and output devices for interacting with a user. For example, the I/O interface may communicate with one or more devices such, as a user-input device and/or an external display, which enable a user to interact directly with the circuitry 114. The user-input device may comprise a keyboard, one or more push-buttons, a touch screen, or other devices that allows a user to input information. The external display may comprise any of a variety of visual displays, such as a viewable screen, a set of viewable symbols or numbers, and so on.

The gunsight 100 shown in FIG. 8 includes a microbolometer 102 that is electrically coupled to the conductive paths 122 of the printed wiring board 118 by a plurality of wires. The gunsight 100 shown in FIG. 8 also includes a display 108 that is electrically coupled to the conductive paths 122 of the printed wiring board 118 by a plurality of wires. The gunsight 100 shown in FIG. 8 also includes an objective optic 104 positioned forward of the microbolometer 102 for focusing electromagnetic waves on the microbolometer 102. The objective optic 104 may comprise one or more objective lenses 106. The gunsight 100 shown in FIG. 8 also comprises an eyepiece optic 110 positioned rearward of the display 108 for allowing a user to view the display 108 through the eyepiece optic 110. The eyepiece optic may comprise one or more eyepiece lenses 112.

Referring, for example, to FIGS. 8 and 9, a gunsight 100 for aiming a firearm may comprise a microbolometer 102 and an objective optic 104 positioned forward of the microbolometer 102 for focusing electromagnetic waves on the microbolometer 102. The gunsight 100 also comprises a display 108 and an eyepiece optic 110 positioned rearward of the display 108 for allowing a user to view the display 108 through the eyepiece optic 110. Circuitry 114 of the gunsight 100 is operatively coupled to the microbolometer 102 and the display 108. The circuitry 114 may comprise one or more processors 116 and a non-transitory computer readable medium 154 storing one or more instruction sets. The processor 116 may receive a stream of motion signals from a motion sensing module 158. In some embodiments, the one or more instruction sets include instructions configured to be executed by the one or more processors 116 to analyze the stream of motion signals from a motion sensing module 158. The processor 116 may determine a present orientation of the bore axis relative to a gravitational pull direction based on a stream of signals from the motion sensing module. The processor 116 may also determine an orientation angle of the bore axis relative to a gravitational pull direction based on the stream of signals from the motion sensing module and compare the orientation angle to a predetermined threshold value. The processor 116 may cause the gunsight 100 to change an operating state of the display from a first brightness to a second brightness value if the orientation angle is greater than the predetermined threshold value. In some embodiments, the first brightness is greater than the second brightness.

Figure 10:
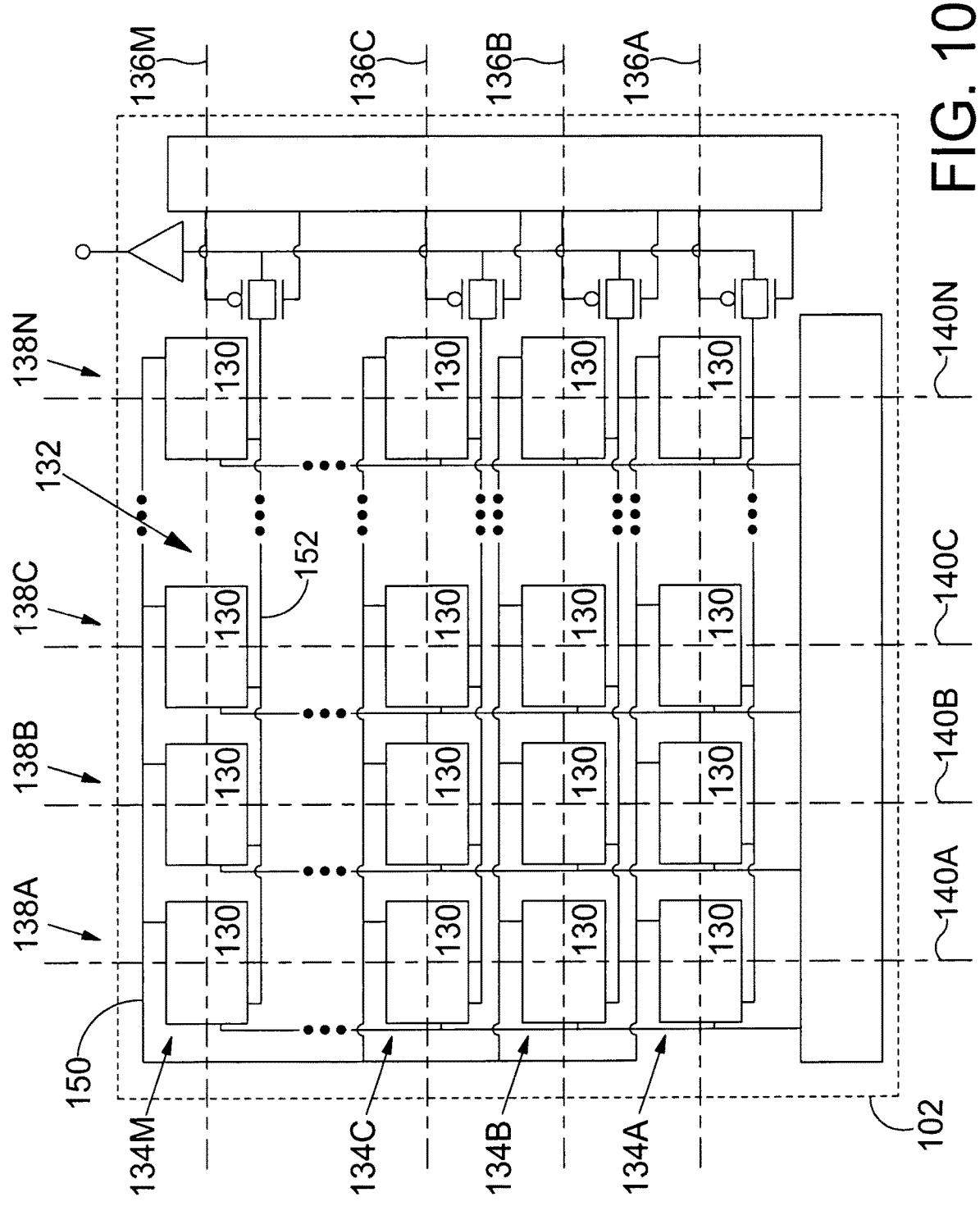
FIG. 10 is a schematic illustration of a microbolometer of a gunsight in accordance with the detailed description.

Referring to FIG. 10, a microbolometer 102 in accordance with some embodiments comprises a plurality of thermally sensitive pixels 130 arranged to form an array 132 of thermally sensitive pixels 130. In the embodiment of FIG. 10, the array 132 of thermally sensitive pixels 130 includes a plurality of rows and a plurality of columns. Each thermally sensitive pixel may comprise, for example, a sensing element and a switching element. It is noted that the thermally sensitive pixels 130 may be arranged in other patterns without deviating from the spirit and scope of this detailed description. The array 132 of thermally sensitive pixels 130 includes a first row 134A of thermally sensitive pixels 130 aligned along a first row line 136A, a second row 134B of thermally sensitive pixels 130 aligned along a second row line 136B, a third row 134C of thermally sensitive pixels 130 aligned along a third row line 136C, and an Mth row 134M extending along an Mth row line 136. The array 132 of thermally sensitive pixels 130 also includes a first column 138A of thermally sensitive pixels 130 aligned along a first column line 140A, a second column 138B of thermally sensitive pixels 130 aligned along a second column line 140B, a third column 138C of thermally sensitive pixels 130 aligned along a third column line 140C, and an Nth column 138N of thermally sensitive pixels 130 aligned along an Nth column line 140N. N and M may be, for example, any integer greater than zero. In the embodiment of FIG. 10, the column lines extend in a first direction and the row lines extend in a second direction, the second direction being generally perpendicular to the first direction.

Figure 11:
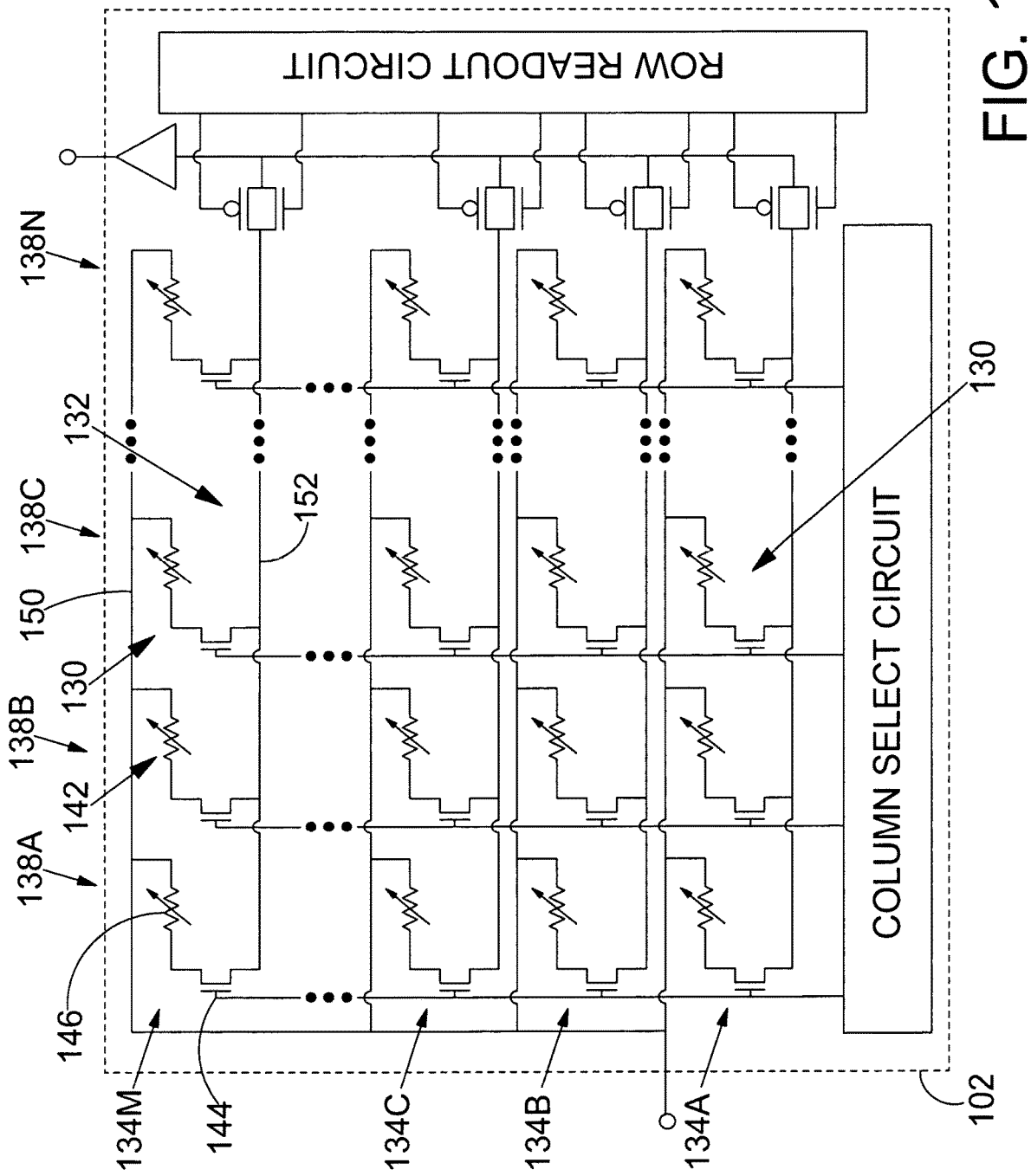
FIG. 11 is a schematic diagram illustrating a microbolometer of a gunsight in accordance with the detailed description.

Referring to FIG. 11, a microbolometer 102 in accordance with some embodiments comprises a plurality of thermally sensitive pixels 130 arranged to form an array 132 of thermally sensitive pixels 130. In the embodiment of FIG. 11, the array 132 of thermally sensitive pixels 130 includes a plurality of rows and a plurality of columns. In the embodiment of FIG. 11, each thermally sensitive pixel includes a sensing element 142 and a switching element 144. Each sensing element 142 comprises a variable resistance element 146 having a first terminal and a second terminal in the embodiment of FIG. 11. With reference FIG. 11, it will be appreciated that the first terminal of each variable resistance element 146 is connected to a input conductor 150. The second terminal of each variable resistance element 146 is electrically connected to a switching element 144 in the embodiment of FIG. 11. Each switching element 144 is capable of selectively creating an electrical connection between a respective variable resistance element 146 and a scan conductor 152.

Referring, for example, to FIGS. 8 and 9, a gunsight 100 for aiming a firearm may comprise a microbolometer 102 and an objective optic 104 positioned forward of the microbolometer 102 for focusing electromagnetic waves on the microbolometer 102. The gunsight 100 also comprises a display 108 and an eyepiece optic 110 positioned rearward of the display 108 for allowing a user to view the display 108 through the eyepiece optic 110. Circuitry 114 of the gunsight 100 is operatively coupled to the microbolometer 102 and the display 108. The circuitry 114 may comprise one or more processors 116 and a non-transitory computer readable medium 154 storing one or more instruction sets. The processor 116 may receive a stream of motion signals from a motion sensing module 158 and detect a ballistic event based on analysis of the stream of motion signals. The processor 116 may also cause a video file to be saved in the non-transitory computer readable medium in response to detecting the ballistic event. The video file may correspond to a timeframe, the timeframe spanning from a first time to a second time, the first time being earlier than the ballistic event and a second time being later the ballistic event. In some embodiments, timeframe has a span of 20 seconds. In some embodiments, the timeframe extends from 10 seconds before the ballistic event to 10 seconds after the ballistic event. In some embodiments, the first time is a time that occurred ten seconds before the ballistic event and the second time is a time that occurred ten seconds after the ballistic event. The video file may comprise, for example, one of a FFMPEF file, an MPEG file, an AVI file, and a WMV file.

Figure 7:
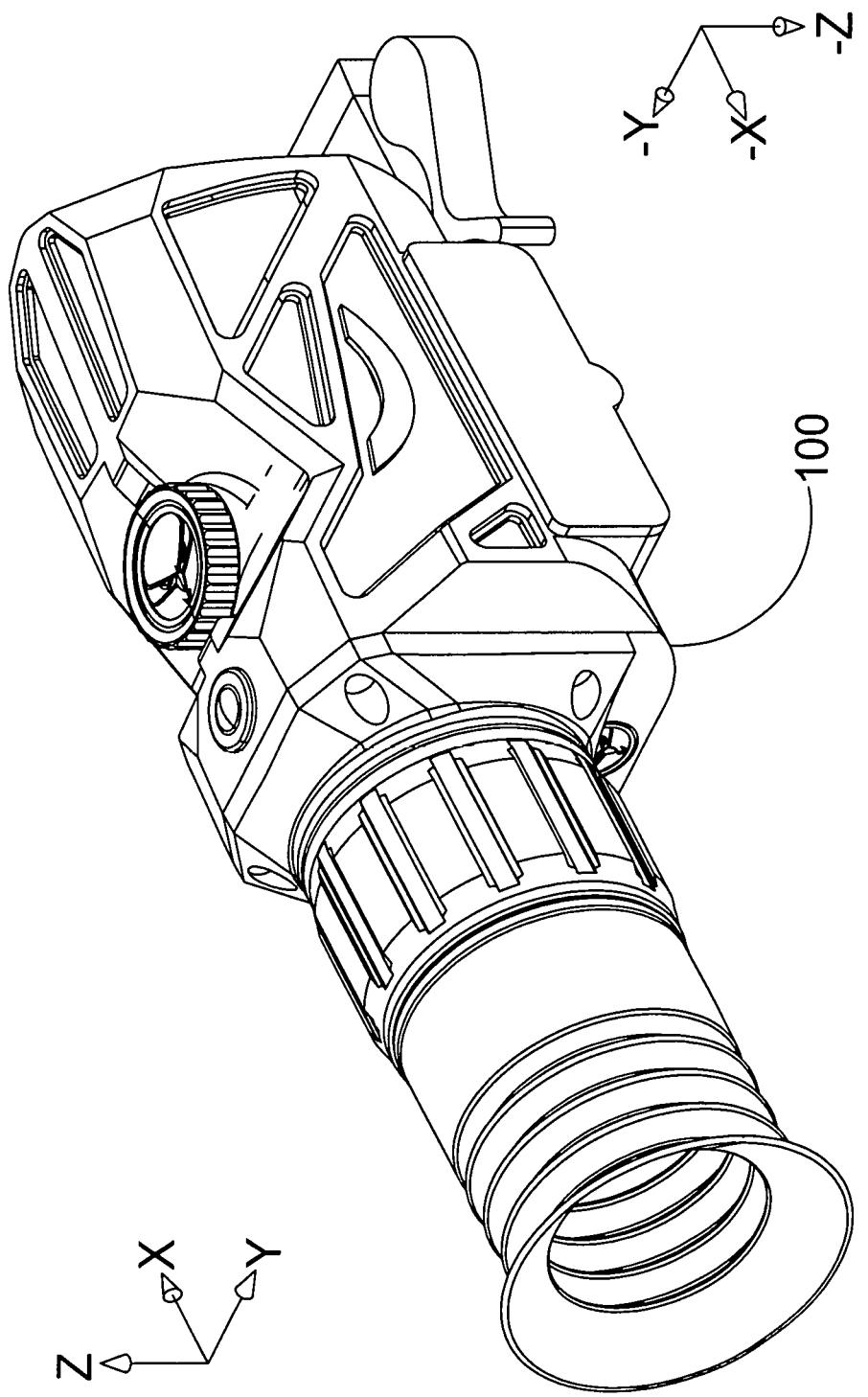
FIG. 7 is a perspective view of a gunsight in accordance with the detailed description.

Referring, for example, to FIGS. 1, 2 and 7, an upward direction Z and a downward or lower direction -Z are illustrated using arrows labeled "Z" and "-Z," respectively. A forward direction Y and a rearward direction -Y are illustrated using arrows labeled "Y" and "-Y," respectively. A starboard direction X and a port direction -X are illustrated using arrows labeled "X" and "-X," respectively. The directions illustrated using these arrows are applicable to the apparatus shown and discussed throughout this application. The port direction may also be referred to as a left direction and/or the portward direction. The starboard direction may also be referred to as a right direction. In one or more embodiments, the upward direction is generally opposite the downward direction. In one or more embodiments, the upward direction and the downward direction are both generally orthogonal to an XY plane defined by the forward direction and the starboard direction. In one or more embodiments, the forward direction is generally opposite the rearward direction. In one or more embodiments, the forward direction and the rearward direction are both generally orthogonal to a ZX plane defined by the upward direction and the starboard direction. In one or more embodiments, the starboard direction is generally opposite the port direction. In one or more embodiments, starboard direction and the port direction are both generally orthogonal to a ZY plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," "portwardly," and "starboardly," should not be interpreted to limit the scope of the invention recited in the attached claims.

The following United States patents are hereby incorporated by reference herein: U.S. Pat. Nos. 6,541,772, 9,069,172, 9,285,189, and 9,602,730. Components illustrated in such patents may be utilized with embodiments herein. Incorporation by reference is discussed, for example, in MPEP section 2163.07(B).

The following United States patents are hereby incorporated by reference herein: U.S. Pat. Nos. 5,166,571, 5,438,231, 5,537,872, 5,585,562, 5,747,691, 5,861,705, 6,010,919, 6,046,531, 6,116,087, 6,389,898, 6,474,162, 6,536,281, 6,564,637, 7,083,740, 7,334,473, 7,360,422, 7,436,107, 7,456,555, 7,481,112, 7,770,450, 7,913,560, 7,982,374, 8,061,202, 8,082,790, 8,198,948, 8,434,363, 8,516,888, 8,723,611, 8,841,762, 8,869,615, 8,910,521, 8,944,570, 8,973,440, 8,991,250, 9,048,418, 9,082,978, 9,091,542, 9,103,674, 9,121,707, 9,123,883, 9,130,147, 9,159,905, 9,217,756, 9,222,775, 9,287,488, 9,341,643, 9,354,060, 9,383,205, 9,400,180, 9,534,894, 9,534,896, 9,546,869, 9,631,926, and 9,696,156. Components illustrated in such patents may be utilized with embodiments herein.

The following United States patents are hereby incorporated by reference herein: U.S. Pat. Nos. 6,184,051, 6,184,052, 6,209,394, 6,235,550, 6,387,725, 6,843,126, 6,845,670, 6,856,144, 6,874,363, 6,936,492, 6,938,334, 7,013,730, 7,024,933, 7,024,934, 7,069,784, 7,140,250, 7,322,242, 7,380,454, 7,392,685, 7,409,862, 7,467,553, 7,516,661, 7,520,171, 7,678,599, 7,784,344, 7,793,544, 7,886,601, 7,926,348, 7,929,143, 7,949,508, 7,984,648, 7,989,906, 8,042,396, 8,056,415, 8,100,010, 8,117,917, 8,122,767, 8,124,895, 8,171,793, 8,220,330, 8,365,596, 8,413,509, 8,418,555, 8,434,364, 8,468,887, 8,499,629, 8,505,380, 8,516,889, 8,539,836, 8,555,719, 8,661,871, 8,661,900, 8,671,756, 8,733,170, 8,810,030, 8,820,161, 8,863,575, 8,873,029, 8,887,567, 9,003,886, 9,009,947, 9,046,546, 9,080,871, 9,116,165, 9,234,913, 9,316,665, 9,322,839, 9,327,962, 9,346,670, 6,354,246, 9,360,496, 9,377,482, 9,383,382, 9,389,077, 9,513,310, 9,580,300, 9,612,254, 9,368,712, and 9,689,888. Components illustrated in such patents may be utilized with embodiments herein.

The above references in all sections of this application are herein incorporated by references in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

One or more embodiments are described herein with reference to program instructions and/or methods, systems, and computer program products for aiming a gunsight according to one or more of the embodiments described herein. It will be understood that these embodiments, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the figures/specification.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified herein.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A gunsight for aiming a firearm, the firearm having a barrel defining a bore, the bore extending along a bore axis, the bore axis extending in a forward direction and a rearward direction, the gunsight comprising:
   a microbolometer and an objective optic positioned forward of the microbolometer for focusing electromagnetic waves on the microbolometer, the objective optic comprising one or more objective lenses;
   a display and an eyepiece optic positioned rearward of the display for allowing a user to view the display through the eyepiece optic, the eyepiece optic comprising one or more eyepiece lenses;
   circuitry operatively coupled to the microbolometer and the display, wherein the circuitry comprises one or more processors and a non-transitory computer readable medium storing one or more instruction sets, wherein the one or more instruction sets include instructions configured to be executed by the one or more processors to cause the gunsight to:
   capture image signals with the microbolometer, the image signals corresponding to a first field of view, the first field of view having a first area;
   display an image, the image corresponding to a second field of view, the second field of view having a second area, the first area being greater than the second area;
   analyze the image signals from the microbolometer and identify one or more heat signatures located inside the first field of view and outside of the second field of view;

display an icon superimposed on the first image, the icon being displayed at an icon position, the icon position being selected based on a location of a selected one of the one or more heat signatures located inside the first field of view and outside of the second field of view.

2. The gunsight of claim 1 wherein the one or more heat signatures comprises at least two heat signatures and wherein the selected one of the one or more heat signatures is closer to the first field of view than at least one other of the one or more heat signatures.

3. The gunsight of claim 1 wherein the one or more heat signatures comprises at least two heat signatures and wherein the selected one of the one or more heat signatures is closer to the first field of view than all of the other one or more heat signatures.

4. The gunsight of claim 1 wherein the icon position is located in an upper right quadrant of the first image if the selected one of the one or more heat signatures is located forward and starboard of a reference heat signature.

5. The gunsight of claim 1 wherein the icon position is located in an upper left quadrant of the first image if the selected one of the one or more heat signatures is located forward and portward of a reference heat signature.

6. The gunsight of claim 1 wherein the icon position is located in a lower right quadrant of the first image if the selected one of the one or more heat signatures is located rearward and starboard of a reference heat signature.

7. The gunsight of claim 1 wherein the icon position is located in a lower left quadrant of the first image if the selected one of the one or more heat signatures is located rearward and portward of a reference heat signature.

8. The gunsight of claim 1 wherein the icon position is located proximate a right edge of the first image if the selected one of the one or more heat signatures is located starboard of a reference heat signature.

9. The gunsight of claim 1 wherein the icon position is located proximate a left edge of the first image if the selected one of the one or more heat signatures is located portward of a reference heat signature.

10. The gunsight of claim 1 wherein the icon position is located proximate an upper edge of the first image if the selected one of the one or more heat signatures is located forward of a reference heat signature.

11. The gunsight of claim 1 wherein the icon position is located proximate a lower edge of the first image if the selected one of the one or more heat signatures is located rearward of a reference heat signature.

12. The gunsight of claim 1 wherein the icon is a direction indicating shape.

13. The gunsight of claim 1, wherein the circuitry further comprises a motion sensing module, wherein the one or more instruction sets include instructions configured to be executed by the one or more processors to further cause the gunsight to:
   display a first image to the user, the first image corresponding to a first magnification;
   receive a stream of motion signals from the motion sensing module;
   detect a ballistic event based on analysis of the stream of motion signals; and
   display a second image to the user in response to detecting of the ballistic event, the second image corresponding to a second magnification; wherein the first magnification is greater than the second magnification.

14. The gunsight of claim 1, wherein the circuitry further comprises a motion sensing module, wherein the one or more instruction sets include instructions configured to be executed by the one or more processors to further cause the gunsight to:
   determine a present orientation of the bore axis relative to a gravitational pull direction based on a stream of signals from the motion sensing module;
   determine an orientation angle of the bore axis relative to a gravitational pull direction based on the stream of signals from the motion sensing module;
   compare the orientation angle to a predetermined threshold value;
   change an operating state of the display from a first brightness to a second brightness value if the orientation angle is greater than the predetermined threshold value;
   wherein the first brightness is greater than the second brightness.

15. The gunsight of claim 14 wherein the display dims if the bore axis is moved to an angle of 45 degrees or more to a second orientation relative to a first orientation.

16. The gunsight of claim 1, wherein the circuitry further comprises a motion sensing module, wherein the one or more instruction sets include instructions configured to be executed by the one or more processors to further cause the gunsight to:
   display a first image based on image signals from the microbolometer;
   receive a stream of motion signals from the motion sensing module;
   detect a ballistic event based on analysis of the stream of motion signals; and
   save a video file in the non-transitory computer readable medium in response to detecting the ballistic event, the video file corresponding to a timeframe, the timeframe spanning from a first time to a second time, the first time being earlier than the ballistic event and a second time being later the ballistic event.

* * * * *